US008068134B2

(12) United States Patent
Yoshizawa

(10) Patent No.: US 8,068,134 B2
(45) Date of Patent: Nov. 29, 2011

(54) APPARATUS AND METHOD FOR PREDICTING COLLISION

(75) Inventor: Ryouzo Yoshizawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1618 days.

(21) Appl. No.: 11/380,138

(22) Filed: Apr. 25, 2006

(65) Prior Publication Data

US 2006/0274149 A1  Dec. 7, 2006

(30) Foreign Application Priority Data

May 13, 2005 (JP) .................. 2005-141485
Jun. 9, 2005 (JP) .................. 2005-169037
Oct. 28, 2005 (JP) .................. 2005-313817

(51) Int. Cl.
*H04N 7/18* (2006.01)
*H04N 5/225* (2006.01)
(52) U.S. Cl. ........................ 348/148; 701/45
(58) Field of Classification Search .............. 348/149, 348/116, 118, 135
See application file for complete search history.

(56) References Cited

U.S. PATENT DOCUMENTS 6,055,042 A * 4/2000 Sarangapani ............. 356/4.01
6,772,057 B2 * 8/2004 Breed et al. .................. 701/45
7,275,431 B2 * 10/2007 Zimmermann et al. ........ 73/510
2005/0065688 A1 3/2005 Rao et al.
2005/0083432 A1 * 4/2005 Honda et al. .................. 348/362

FOREIGN PATENT DOCUMENTS

| DE | 198 45 568 | 10/1999 |
| DE | 100 25 678 | 12/2001 |
| DE | 102 02 908 | 7/2003 |
| EP | 1 338 477 | 8/2003 |
| JP | 06-286581 | 10/1994 |
| JP | 09-284954 | 10/1997 |
| JP | 11-258339 | 9/1999 |
| JP | 2000-329852 | 11/2000 |
| JP | 2001-134769 | 5/2001 |
| JP | 2004-122908 | 4/2004 |
| WO | 2004/110828 | 12/2004 |

* cited by examiner

*Primary Examiner* — David Ometz
*Assistant Examiner* — Carramah J Quiett
(74) *Attorney, Agent, or Firm* — Rankin, Hill & Clark LLP

(57) ABSTRACT

The present invention is a collision prediction apparatus that comprises a plurality of sensors for detecting an object in front of a vehicle by different mechanism and a control unit for selecting a sensor adequate for an input condition and predicting a collision between the vehicle and the object, based on information obtained from the selected sensor, wherein the plurality of the sensors comprise a radar for scanning front of the vehicle and a camera for taking an image of the front of the vehicle, and when a condition that it is lighter outside the vehicle than a predetermined value is input, it is enabled to configure a control unit so as to predict a collision between the vehicle and the object.

13 Claims, 12 Drawing Sheets

FIG. 6

|  |  | α | β | γ |
|---|---|---|---|---|
| Condition1 | Day and Good Weather | 1.0 | 0.0 | 0.0 |
| Condition2 | Day and Bad Weather | 0.8 | 0.2 | 0.0 |
| Condition3 | Night and Good Weather Headlight ON | 0.5 | 0.5 | 0.0 |
| Condition4 | Night and Bad Weather Headlight ON | 0.4 | 0.5 | 0.1 |
| Condition5 | Night and Good Weather Headlight OFF | 0.4 | 0.5 | 0.1 |
| Condition6 | Night and Bad Weather Headlight OFF | 0.2 | 0.7 | 0.1 |

APPARATUS AND METHOD FOR PREDICTING COLLISION

BACKGROUND OF THE INVENTION

1. Field of the Invention

The present invention relates to a collision prediction apparatus and method for predicting a collision between a vehicle such as an automobile and an object in front of the vehicle.

2. Description of the Related Art

As a protector for protecting a passenger when an automobile collides with an object in front, there exists the protector for fixing the passenger at his or her seat by: detecting the object in front with a radar mounted on the automobile; and in a case of determining that there exists a possibility of a collision, actuating a pretensioner mechanism of a seat belt, based on a distance and a relative speed till/with the object in front; and winding up the seat belt (for example, see paragraphs 0052 to 0060 and FIG. 1 in Japanese Patent No. 2946995).

In addition, there exists a protector for improving an impact absorption performance by: detecting a object in front with a radar mounted on an automobile; and in a case of determining that there exists a possibility of a collision, moving a front bumper forward; and providing a space between the front bumper and an automobile body frame before the collision (for example, see paragraphs 0013 and FIG. 1 in Japanese Patent Laid-Open Publication No. 2004-122908).

Because each protector described above actuates just before a collision, it is requested to accurately detect a distance from an automobile to an object and to predict the collision. Particularly, in a protector for moving a front bumper forward, because it is necessary to ensure a time for moving the front bumper forward just before a collision, it is necessary to accurately predict the collision.

However, because although a control unit of a conventional protector predicts a collision based on information in front of a vehicle obtained by using sensors such as a radar and a camera, a detection accuracy of the sensors varies according to a relationship between other vehicles and buildings and/or various environments such as a day, a night, and a bad weather, there is a problem that the collision cannot be always detected accurately.

Consequently, a collision prediction apparatus and method are strongly requested that solve the problem, can accurately detect an object in front of the vehicle according to variations of various traffic environments, and can accurately predict a collision.

SUMMARY OF THE INVENTION

The present invention to solve the problem is a collision prediction apparatus that comprises a plurality of sensors configured to detect an object in front of a vehicle by different mechanism, and a control unit configured to select a sensor adequate for an input condition and to predict a collision between the vehicle and the object, based on information obtained from the selected sensor.

Because thus a collision prediction apparatus of the present invention is configured to select a sensor adequate for an input condition and predict a collision between a vehicle and an object, based on information obtained from the selected sensor, it can accurately detect the object in front of the vehicle according to variations of various traffic environments, and can accurately predict the collision.

Meanwhile, a plurality of sensors configured to detect an object by different mechanism are existing sensors such as a radar, a laser, and a camera, and a configuration thereof is not limited.

In addition, an input condition is, for example, information whether a vehicle outside is lighter or darker than a predetermined value, and such an environment of the vehicle outside is input as a condition; thereby a sensor adequate for a traffic environment results in being selected.

In the collision prediction apparatus, a plurality of sensors comprise a radar configured to scan front of a vehicle and a camera configured to take an image object in front of the vehicle, and when a condition that it is lighter outside the vehicle than a predetermined value is input, it is enabled to configure a control unit so as to predict a collision between the vehicle and an object by using: a processing area setting mechanism for setting a processing area within a taken image of a camera so as to recognize and include an image of the object from within the taken image; a refection wave extraction mechanism for extracting a reflection wave of a radar in the processing area; a processing area object detection mechanism for detecting an area of the object, a distance from the vehicle to the object, and a relative speed between them, based on the reflection wave extracted from the processing area; and a collision determination mechanism for determining a possibility of the collision between the vehicle and the object, based on the distance from the vehicle to the object and the relative speed between them.

Thus in a case that a vehicle outside is lighter than a predetermined value and a taken image of a camera is clear, by extracting a reflection wave of a radar in a processing area so as to include an image of an object and analyzing such an intensity of the reflection wave, a possibility of a collision is determined, based on a distance from a vehicle to an object and a relative speed between them, and because it becomes unnecessary to analyze all reflection waves from front of the vehicle scanned by radar, it is enabled to improve an analysis capacity of a reflection wave from an object in front without increasing a processing amount of a control unit and to accurately detect the object in a short time. Thus, even in a case that there exists a plurality of objects, it is enabled to accurately predict in a short time a collision between a vehicle and an object without using a processor higher in processing capacity.

In the collision prediction apparatus, in a case that a condition that it is darker outside a vehicle than a predetermined value, a control unit can be configured to predict a collision between a vehicle and an object by using a front area object detection mechanism and collision determination mechanism for detecting an object area, a distance from the vehicle to the object, and a relative speed between them, based on a reflection wave scanned and detected by radar from front of the vehicle.

Thus because in a case that a vehicle outside is darker than a predetermined value, the collision prediction apparatus is configured to detect an object area, a distance from a vehicle to an object, and a relative speed between them, based on a reflection wave scanned and detected by radar from front of the vehicle, it is enabled to detect the object in front of the vehicle and predict a collision even in a case that the vehicle outside is darker, an image taken by camera becomes unclear, and a reliability thereof is lowered.

Meanwhile, in a case of configuring to compare an area of an object detected by a front area object detection mechanism with information obtained from an image taken by camera of which a reliability is lowered and to inspect a detection accuracy of the object, it is enabled to improve the reliability of the object detection.

In the collision prediction apparatus a processing area object detection mechanism can be configured to multiply a reflection processing area, which is estimated as a reflection wave from an object, by a weighting factor according to an input condition, based on a difference among a processing area, a reflection area of an area of a reflection wave extracted from the processing area, and the reflection wave of the reflection area detected for every predetermined time; and thereafter to define it an object area an area obtained by adding the processing area, the reflection area, and the reflection processing area.

Here, as a configuration of deriving an area estimated to be a reflection wave from an object, based on a difference of a reflection wave detected for every predetermined time can be cited, for example, the configuration of defining an area of an object in front of a vehicle by sequentially comparing a distance value and a relative speed value detected from a reflection wave of a reflection area detected for every predetermined time and by estimating a reflection wave, of which a difference between the distance value and the relative speed value becomes not more than a threshold set in advance, to be a reflection wave from a same object.

Thus, multiplying a processing area set based on a camera image, a reflection area of an area of a reflection wave within the processing area, a reflection processing area of an area, which is estimated to be the reflection wave from an object, by a weighting factor according to a condition such as a day, a night, and a weather; and thereafter by defining it an area of the object the area obtained with adding the processing area, the reflection area, and the reflection processing area, it is enabled to enhance a dependency ratio on a sensor of which a reliability is higher in various conditions when detecting an area in front of a vehicle.

Thus, without being influenced by traffic environment outside, it is enabled to enhance a detection accuracy of an object area and shorten a time taken for detection.

In the collision prediction apparatus a control unit can be configured to comprise an object error detection mechanism for detecting an error between a processing area set with a processing area setting mechanism and an area of an object detected with a processing area object detection mechanism.

Thus by detecting an error between a processing area set with a processing area setting mechanism and an area of an object detected with a processing area object detection mechanism, it is enabled to compare a size of an object recognized from a taken image of a camera with that of an object detected, based on a reflection wave of a radar and to analyze a detection accuracy of the camera and the radar.

In the collision prediction apparatus a processing area setting mechanism is configured to divide a processing area into a front area and side area of an object, and a control unit can be configured to comprise an object movement direction detection mechanism for determining a possibility of a collision between a vehicle and the object, based on a movement direction of the side area.

Thus by dividing a processing area into a front area and side area of an object, detecting a movement direction of the side area, and grasping which direction the object is moving with respect to a vehicle, a possibility of a collision is determined, and thereby, it is enabled to improve a prediction accuracy of the collision.

In the collision prediction apparatus it is preferable that a processing area setting mechanism is configured to divide a taken image at a position corresponding to a predetermined distance in front of a vehicle and to set a processing area within an area nearer than the predetermined distance.

Thus because the collision prediction apparatus divides a taken image at a position corresponding to a predetermined distance in front of a vehicle and sets a processing area within an area nearer than the predetermined distance, it becomes unnecessary to analyze a reflection wave from an object from which a distance is farther and with which a possibility of a collision is lower, and thus it is enabled to reduce a processing amount of a control unit and shorten a time taken to predict the collision.

In the collision prediction apparatus a processing area object detection mechanism can be configured to make an object area for every predetermined time; a collision determination mechanism can be configured to sequentially combine the object area made for every predetermined time.

Thus by configuring to sequentially combine an object area made for every predetermined time, because even if a reflection point of a reflection wave on an object varies as a time elapses, it is enabled to estimate an object area based on an object area made so far, it is enabled to improve a prediction accuracy of a collision.

In the collision prediction apparatus a processing area object detection mechanism can be configured to make a direction corresponding to an intensity peak value an object direction in a relationship between a direction and intensity of an extracted reflection wave.

Thus by making a direction corresponding to an intensity peak value an object direction, because the direction is specified by point without specifying the direction by total shape, it is enabled to reduce a processing amount of a control unit and shorten a time taken to predict a collision.

In the collision prediction apparatus a processing area object detection mechanism can be configured to make a relationship between a direction and intensity of an extracted reflection wave for every predetermined time; a collision determination mechanism can be configured to sequentially compare the relationship between the direction and intensity of the extracted reflection wave and to determine a possibility of a collision between an object and a vehicle, based on a variation of a number of an intensity peak value.

Here, in a case that a number of an intensity peak value of a reflection wave from an object decreases, the object results in moving toward a direction deviated from a vehicle and in an overlap amount decreasing in a vehicle width direction between the vehicle and the object. Consequently, in a collision determination mechanism it is enabled to configure so as to determine a possibility of a collision between a vehicle and an object, based on a variation of a number of an intensity peak value of a reflection wave, and in a case of the number decreasing, to improve a prediction accuracy of the collision by determining that there exists no possibility of the collision between the vehicle and the object or less severity thereof.

In the collision prediction apparatus a processing area object detection mechanism can be configured to make a graph of a waveform consisting of a relationship between a direction and intensity of an extracted reflection wave, to perform the graph with low pass filter processing, and thereafter to make it an object direction a direction corresponding to a gravity center position of an area calculated by integrating the intensity.

In addition, in the intensity of the extracted reflection wave the processing area object detection mechanism can also be configured to make a graph where a plurality of peak values are connected and to make it an object direction a direction corresponding to a gravity center position of an area calculated by integrating the graph.

Thus performing a graph consisting of a relationship between a direction and intensity of an extracted reflection wave with low pass filter processing and thereafter making it an object direction a direction corresponding to a gravity center position of an area calculated by integrating the intensity; and in the intensity of the extracted reflection wave, making it the object direction a direction corresponding to a gravity center position of an area calculated by integrating the graph, it is enabled to specify the object direction even if there enters some noise in the reflection wave.

In the collision prediction apparatus, in a case that a plurality of processing areas are set within a taken image with a processing area setting mechanism, a control unit can also be configured to determine a possibility of a collision between a vehicle and an object for each processing area.

Thus in a case that a plurality of processing areas are set within a taken image, by determining a possibility of a collision between a vehicle and an object for each processing area, it is enabled to accurately predict the possibility of a collision with each object and to handle a complicated traffic environment in a case that there exist a plurality of objects in front of the vehicle.

In addition, the present invention is a collision prediction method for predicting a collision between a vehicle and an object in front of the vehicle, and the method comprises the steps of: scanning front of the vehicle by radar and detecting direction information for indicating a direction of the object, based on a reflection wave of the radar; recognizing an object image from a whole of a taken image in front of the vehicle taken by camera, based on the direction information, and setting a processing area within the taken image so as to include the object image; detecting an object area from the processing area, and detecting a distance from the vehicle to the object and a relative speed between them, based on a reflection wave of the radar extracted from the processing area; and determining a possibility of a collision between the vehicle and the object, based on the object area, the distance from the vehicle to the object, and the relative speed between them.

Thus setting a processing area within a taken image based on direction information of an object, analyzing such an intensity of a reflection wave of a radar, and thereby determining a possibility of a collision based on a distance from a vehicle to an object in front of the vehicle, and a relative speed between them, it becomes unnecessary to analyze all reflection waves from front of the vehicle scanned by radar; therefore, it is enabled to improve an analysis capacity of the reflection wave from the object in front without increasing a processing amount of a control unit and to accurately detect the object in a short time. Thus, even in a case that there exist a plurality of objects in front of a vehicle, it is enabled to accurately predict in a short time a collision between the vehicle and the objects without using a processor higher in processing capacity.

BRIEF DESCRIPTION OF THE DRAWINGS

FIG. 1A is a schematic drawing of a general configuration; and FIG. 1B is a schematic drawing of a control unit.

FIG. 3A is a taken image of a state of a processing area being set; and FIG. 3B is a graph showing a relationship between a direction and intensity of a reflection wave.

FIG. 4A is a drawing showing a relationship between a spread and area of a reflection wave; FIG. 4B is a drawing where a detected area is shown within a taken image.

FIG. 6 is a table showing various conditions used in detecting an area of an automobile in front in a collision prediction apparatus of the embodiment.

FIG. 8A is a taken image in a state of a processing area of an automobile in front being divided into a front area and a side area; FIG. 8B is a taken image of the automobile in front having approached from the state of FIG. 8A.

FIG. 9A is a taken image in a state of an automobile in front being detected; FIG. 9B is a taken image in a state of a reflection point being reduced by the automobile in front approaching from the state of FIG. 9A.

FIG. 11A is a drawing where a graph of a waveform consisting of a relationship between a direction and intensity of a reflection wave is performed with low pass filter processing; and FIG. 11B is a graph where a plurality of peak values are connected in the intensity of the reflection wave.

BEST MODES FOR CARRYING OUT THE INVENTION

Next will be described embodiments of the present invention in detail, referring to drawings as needed.

Figure 1A:
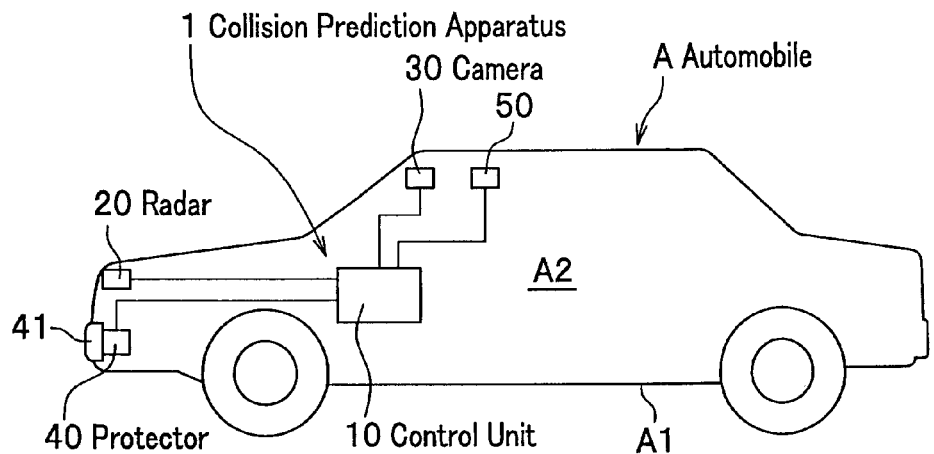
FIGS. 1A and 1B are drawings showing a collision prediction apparatus of an embodiment of the present invention.
Figure 2:
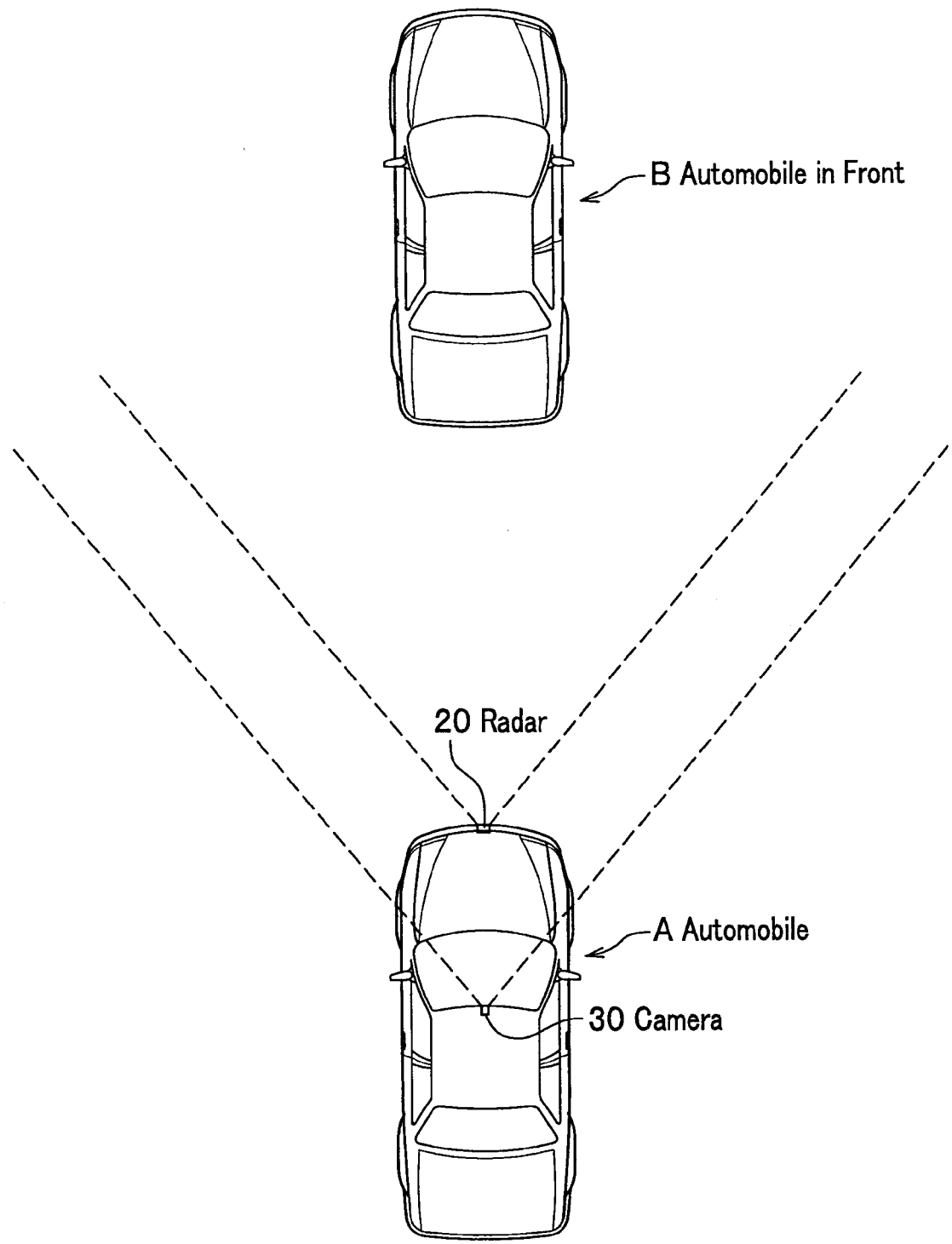
FIG. 2 is a plan view showing an aspect of an automobile in front being detected by a collision prediction apparatus of the embodiment.

A collision prediction apparatus of the present invention is applicable to various vehicles such as an automobile, and in an embodiment of the invention, as shown in FIG. 1A will be described a collision prediction apparatus 1 mounted on an automobile A, and as shown in FIG. 2 will be described a case of predicting a collision with an automobile B existing in front of the automobile A.

Meanwhile, in a description below "front/back," "left/right," and "up/down" correspond to respective directions of an automobile.

As shown in FIG. 1A, the collision prediction apparatus 1 is mounted on the automobile A and comprises a radar 20 attached to a front end portion of an automobile body A1, a camera 30 attached to a front upper portion of a driving room A2, an illuminance sensor 50 for detecting lightness outside the automobile A, and a control unit 10 for predicting a collision with an automobile in front.

In addition, the automobile A is provided with a protector 40 for improving an impact absorption performance in collision by moving a front bumper 41 forward and providing a space between the bumper 41 and an automobile body frame (not shown) before the collision in a case that the collision prediction apparatus 1 determines that there exists a possibility of the collision.

The radar 20 is, as shown in FIG. 2, an existing sensor for scanning front of the automobile A and receiving a reflection wave reflected by an object such as the automobile B in front. In the embodiment a scan width of the radar 20 is 40 degrees in each direction of left/right, and the radar 20 has a spread of 1.5 degrees in each direction of up/down.

The camera 30 is an existing sensor for taking an image of the front of the automobile A and is a monocular camera having an image angle for taking an image of a range including a range scanned by the radar 20.

Here, if matching a placement position of a monocular camera in a width direction of the automobile A with that of the radar 20 in the width direction, because in a view of the camera, optical paths where a reflection wave from an object enters the radar 20 and a reflection light from the object enters the camera 30 become approximately same, left/right positions of an area of the object detected by each of them result in matching, it is enabled to improve a detection accuracy of an object in front of the automobile A combined by the radar 20 and the camera 30. Thus in the collision prediction apparatus 1 of the present invention, because it is preferable to use a monocular camera, it becomes unnecessary to use a stereo camera expensive and complicated in image processing, and is enabled to reduce cost of a product and shorten a time taken for the image processing.

The illuminance sensor 50 is an existing sensor for detecting lightness outside the automobile A. Meanwhile, a configuration of detecting lightness outside the automobile A can also be configured to detect the lightness by ON/OFF of a headlight switch of the automobile A.

The control unit 10 is an ECU (Electronic Control Unit) that comprises a processing area setting mechanism 11 for setting a processing area within a taken image of the camera 30; a reflection wave extraction mechanism 12 for extracting a reflection wave of the radar 20 in the processing area; a processing area object detection mechanism 13 and a front area object detection mechanism 15 for detecting an area of an automobile in front, a distance from the automobile A to the automobile in front, and a relative speed between them; a collision determination mechanism 14 for determining a possibility of a collision with the automobile in front; and a prediction system selection mechanism 16 for selecting a requested mechanism out of the mechanisms 12, 13, 14, and 15 in order to perform a prediction of the collision adequate for an input condition; each of the mechanisms 12, 13, 14, 15, and 16 is realized by a CPU (Central Processing Unit) running a given program.

Figure 3A:
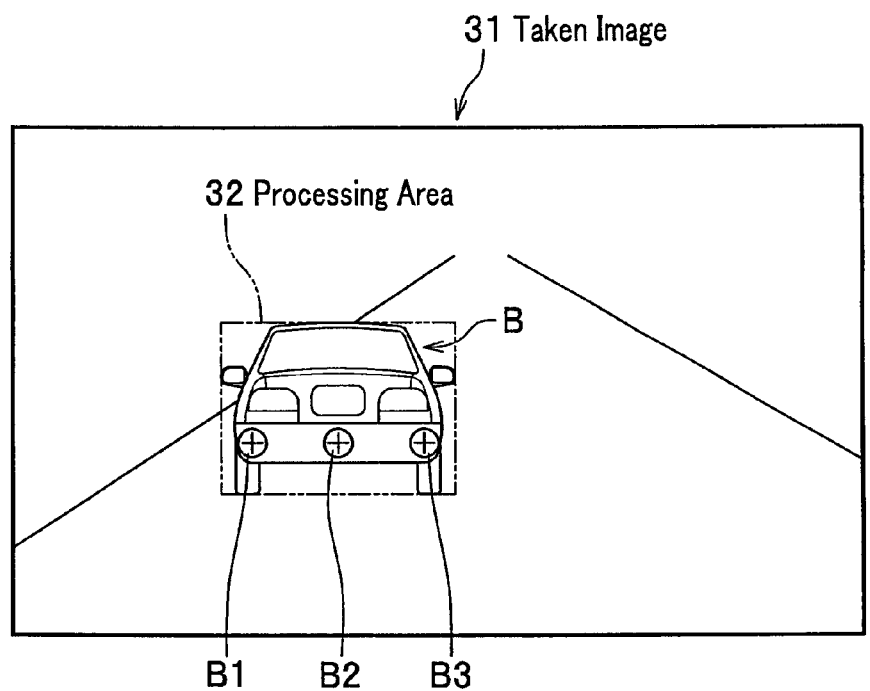
FIGS. 3A and 3B are drawings showing a state of an automobile in front being detected by a collision prediction apparatus of the embodiment.

The processing area setting mechanism 11 is configured, as shown in FIG. 3A, to recognize an image of the automobile B in front from a whole of a taken image 31 of the camera 30 (see FIG. 2) and to set a processing area 32 within the taken image 31 so as to include the image of the automobile B in front.

Meanwhile, a method of recognizing an image of the automobile B in front from within the taken image 31 is not limited, and for example, by detecting an object moving within the taken image 31, it is enabled to use an existing method of recognizing the automobile B within the taken image 31.

To be more precise, in a case that the automobile A runs at a low speed not more than 5 km or stops, because a variation ratio of a background is lower with respect to the automobile B of a detection object, it is enabled to recognize something with a larger variation out of images taken for every predetermined time as an image of the automobile B in front and to improve a speed of image processing. Meanwhile, by removing such objects (trees, electric wires, airplanes, footbridges, and the like) up in the air, a bonnet of own automobile, and a fixture at roadsides, it is enabled to make a processing speed higher.

In addition, in a case that the automobile A is running at a middle or high speed, because it is not enabled to use the processing method, it is enabled to use any one of such a binary pattern matching, shading (luminance) template matching, profile pattern matching, genetic algorithm application, and neutral network of known methods. Particularly, because the profile pattern matching of using profile data and gradient data of a gray value in a normal direction of the profile data is effective in a case of recognizing a movement body within an image (for example, image in bad weather) poor in image quality, it is effective in a case of processing images taken in various meteorological conditions as in the present invention.

In addition, in a case of a night regardless of a running speed, by setting a lit state of lighting apparatuses such as headlights, tail lamps, and brake of the automobile A as a standard template and stepwise classifying them according to a luminance level, it is enabled to perform stable image processing, which is difficult to receive an influence by a presence or absence of lighting of the lighting apparatuses of the automobile A, from a start state of becoming dark.

In addition, by detecting direction information based on a reflection wave from front scanned by the radar 20 (see FIG. 2) for indicating a direction of an object (automobile B) in front and by performing image processing of only a predetermined range from a whole of the taken image 31 in front taken by the camera 30 based on the direction information, it is also enabled to recognize an image of the automobile B in front and to set the processing area 32 within the taken image 31 so as to include the image of the automobile B. In this case, because the range of the image processing is narrowed down based on the direction of an object, it is enabled to reduce a load of the image processing.

The reflection wave extraction mechanism 12 is configured to extract a reflection wave in the processing area 32 set with the processing area setting mechanism 11 out of reflection waves in front scanned by the radar 20 (see FIG. 2).

The processing area object detection mechanism 13 is a mechanism for analyzing a reflection wave extracted with the reflection wave extraction mechanism 12, and is configured to specify a direction of the automobile B in front, based on a direction of the reflection wave extracted with the reflection wave extraction mechanism 12; to detect an area of the automobile B, based on a spread of the reflection wave in the specified direction; and to detect a distance from the automobile A to the automobile B and a relative speed between them, based on such an intensity of the reflection wave.

Figure 3B:
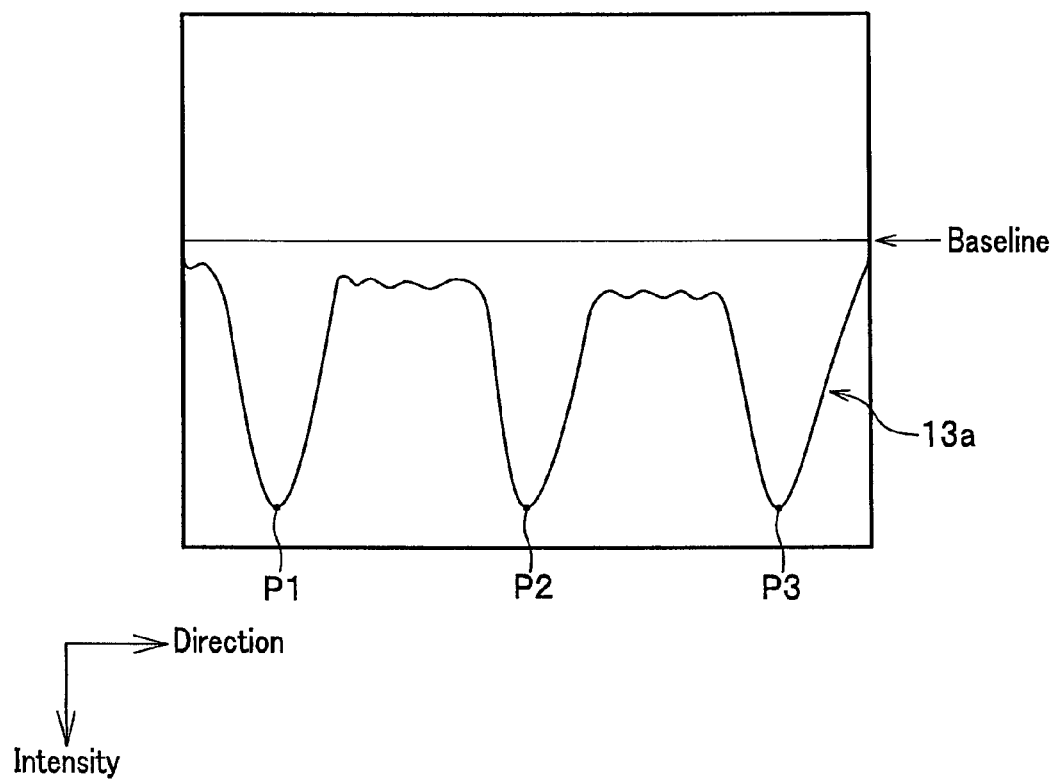
Figure 4A:
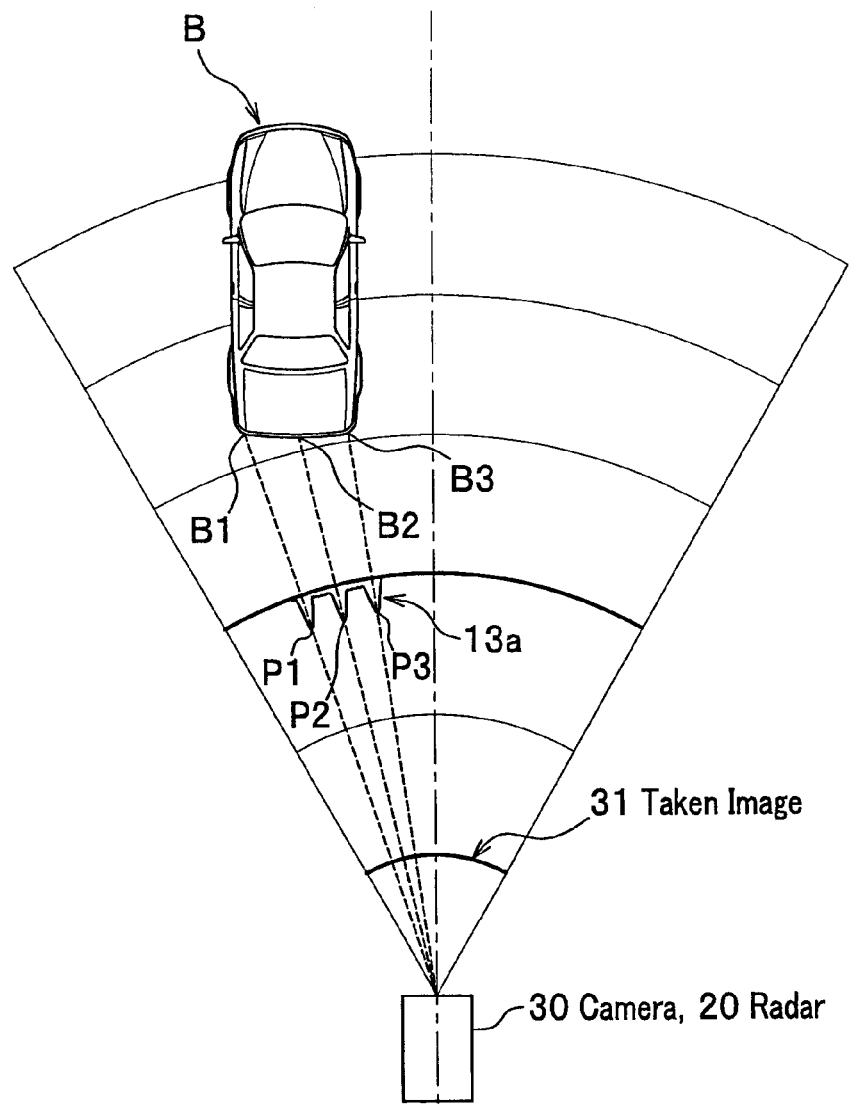
FIGS. 4A and 4B are schematic drawings showing a state of an automobile in front being detected by a collision prediction apparatus of the embodiment.
Figure 4B:
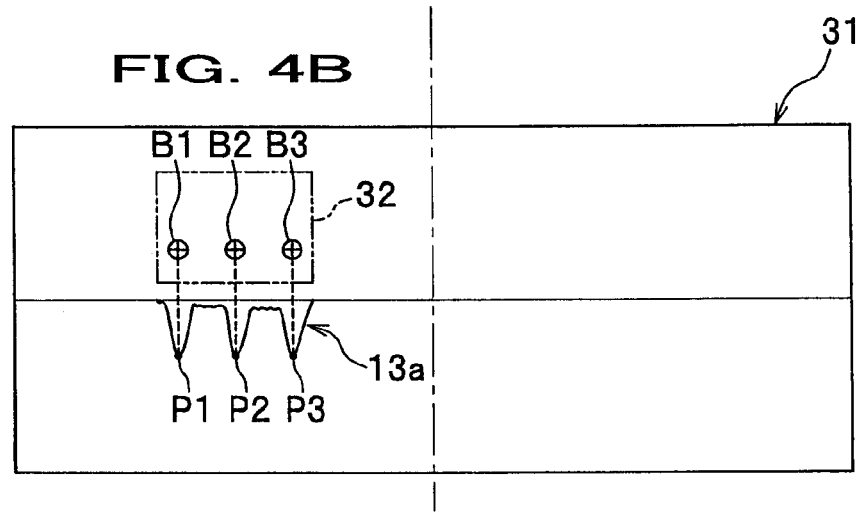

The processing area object detection mechanism 13 makes, as shown in FIG. 3B, a graph 13a showing a relationship between a direction and intensity of a reflection wave Here, as shown in FIG. 4, out of a reflection wave reflected from the automobile B in front, a component reflected by a vertical plane with respect to a radiation direction of the radar 20 like a bumper and door mirrors of the automobile B or a flat portion of an automobile body becomes stronger than other components. Accordingly, in the graph 13a of showing the relationship between the direction and intensity of the reflection wave, a direction corresponding to a peak value of the intensity results in indicating a direction of the automobile B in front. Meanwhile, in the embodiment a monocular camera is used as the camera 30, and an area of an object detected by the camera 30 and that of the object detected by the radar 20 match in left/right positions.

The processing area object detection mechanism 13 is configured to define a direction corresponding to peak values P1, P2, and P3 of the intensity; to detect an area of the automobile B (see FIG. 3A) in front, based on a spread of a reflection wave in the direction; and to detect a distance from the automobile A to the automobile B and a relative speed between them, based on the peak values P1, P2, and P3 of the intensity.

In the automobile B of the embodiment, although reflection waves from three reflection points B1, B2, and B3 positioned at a back face of a rear bumper especially become stronger, a position of a reflection point is supposed to vary according to an object shape.

Figure 5:
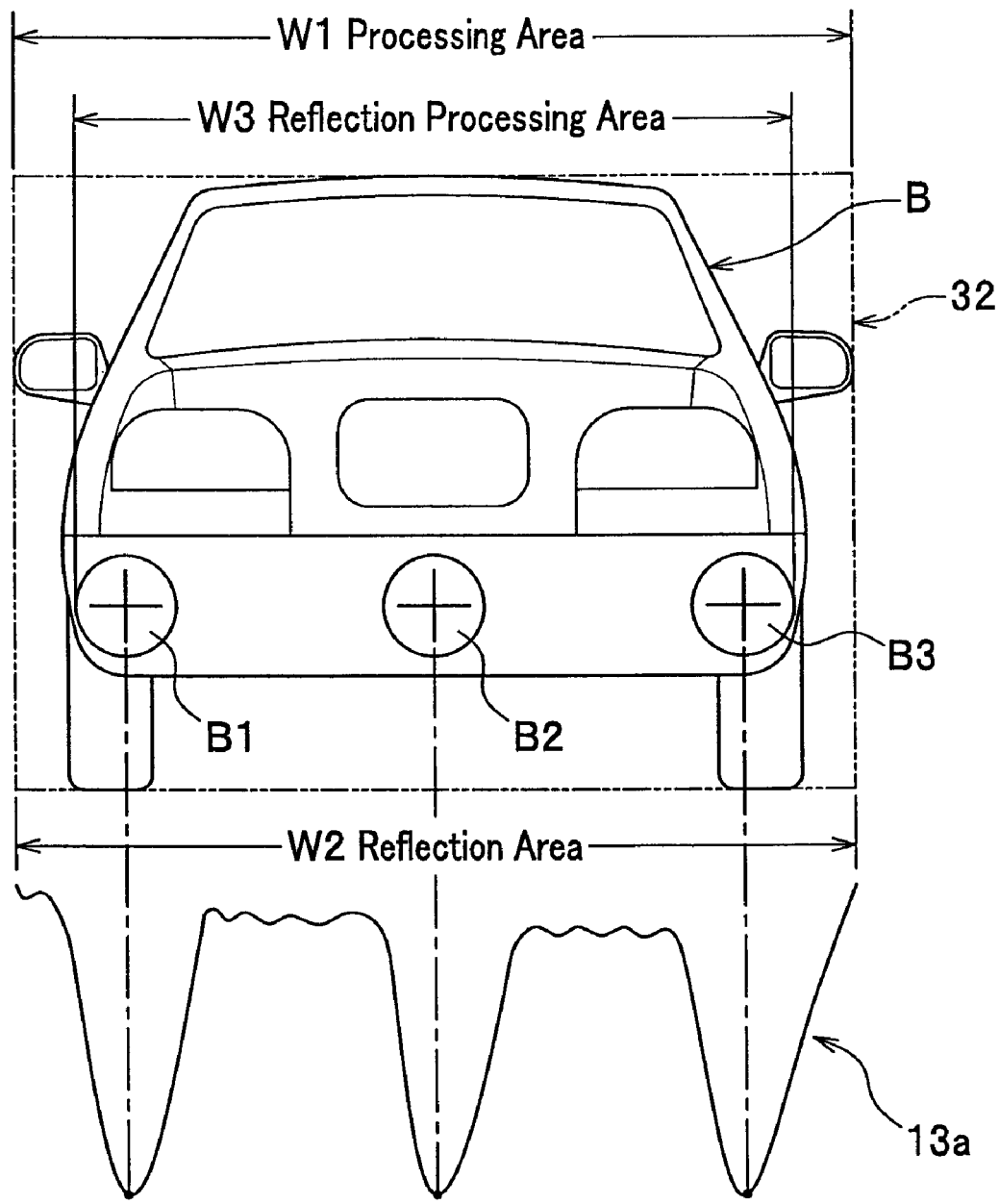
FIG. 5 is a schematic drawing showing an area of an automobile in front detected by a collision prediction apparatus of the embodiment.

Meanwhile, as a method of detecting a width of an area of the automobile B in front with the processing area object detection mechanism 13, it is enabled to use the method of defining the width of the area as the width of the area of the automobile B, which the width is obtained by multiplying a width W1 of the processing area 32 shown in FIG. 5, a width W2 of a reflection area of an area of a reflection wave extracted from the processing area 32, and a width W3 of a reflection processing area of an area, which is estimated to be a reflection wave from the automobile B based on a difference of the reflection wave of the reflection area detected for every predetermined time, by a weighting factor according to an input condition; and thereafter by adding the width W1 of the processing area 32, the width W2 of the reflection area, and the width W3 of the reflection processing area.

In a case that a plurality of objects overlap in longitudinal directions at a short distance in the reflection area of the area of a reflection wave extracted from the processing area 32, because they are detected as an integrated object, a detection accuracy of each of the objects results in becoming lower.

Consequently, sequentially comparing a distance value and a relative speed detected from a reflection wave of a reflection area detected for every predetermined time, a reflection wave of which a difference between the distance value and the relative speed is not more than a threshold set in advance is estimated to be the reflection wave from a same object. Then defining a direction of the estimated reflection wave, a reflection processing area estimated to be the area of the automobile B in front is detected, based on a spread of the reflection wave in the direction. Meanwhile, because the reflection processing area is detected to be smaller than an area of an actual object, it is enabled to improve a detection accuracy by repeating a detection of the reflection processing area and increasing a data amount.

Furthermore, in the processing area object detection mechanism 13, as shown in equation 1, is defined an area of the automobile B in front by respectively multiplying the width W1 of the processing area 32, the width W2 of the reflection area, and the width W3 of the reflection processing area by weighting factors α, β, and γ according to an input condition; and thereafter by adding the widths W1, W2, and W3.

$$\text{Area of the automobile } B \text{ in front (width)} = \alpha * W1 + \beta * W3 + \gamma * W2 \quad \text{Eq. 1}$$

Figure 1B:
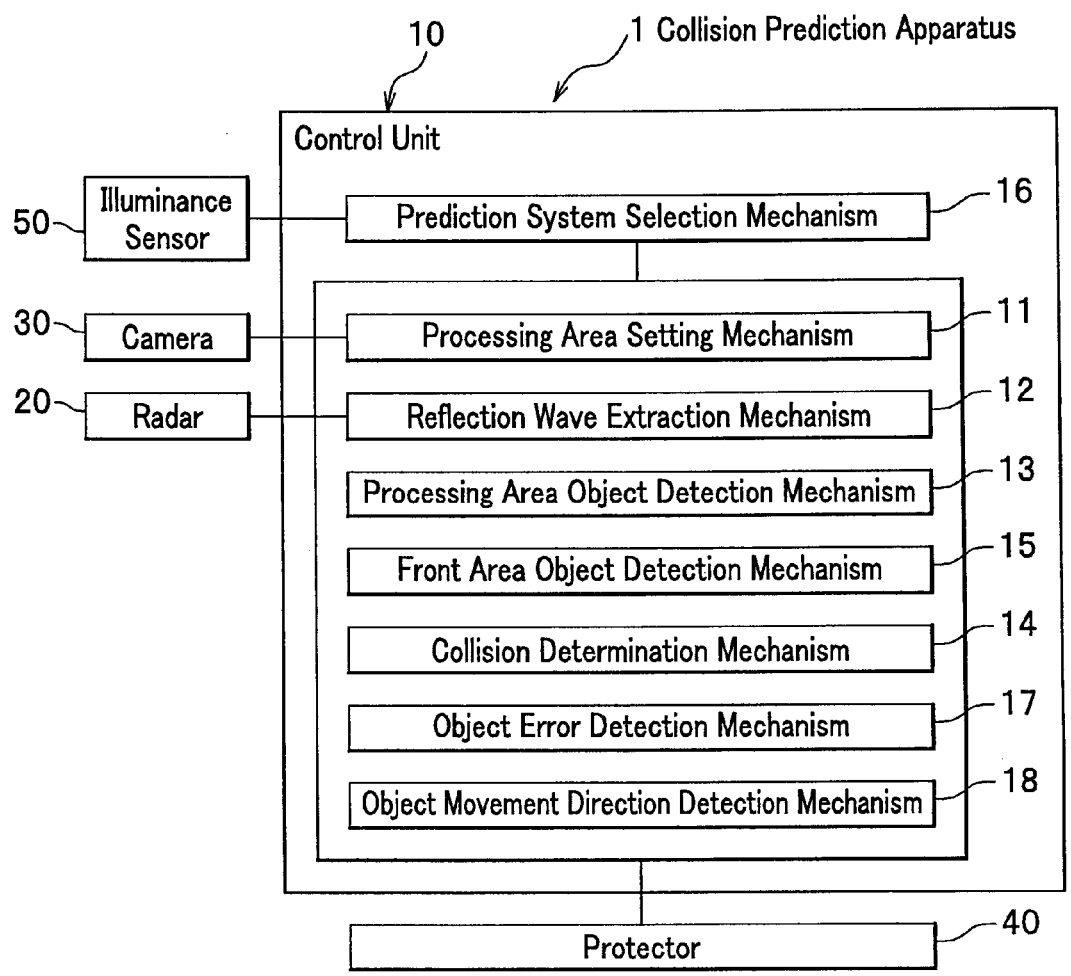

Here, the input condition is a traffic environment such as a day, a night, and a weather, and in the embodiment, in a memory unit of the control unit 10 (see FIG. 1), as shown in a table of FIG. 6, is memorized each factor classified and set into six conditions, and the factor is configured so that the processing area object detection mechanism 13 selects a condition, based on lightness outside an automobile detected by the illuminance sensor 50 (see FIG. 1) and ON/OFF of a headlight switch.

To be more precise, in a case that it is light outside an automobile as conditions 1 and 2, it is adapted to enhance a dependency ratio on a detection result by the camera 30 (see FIG. 1) and to define the width of the area of the automobile B in front. In addition, in a case that it is dark outside an automobile as conditions 3 to 6, it is adapted to enhance a dependency ratio on a detection result by the radar 20 (see FIG. 1), which is not influenced by lightness outside the automobile, as a reliability of an image of the camera 30 lowers, and to define the area of the automobile B in front.

Meanwhile, in a case that the reliability of the image of the camera 30 remarkably lowers at night or in a tunnel, it is also enabled to set so as to detect the area of the automobile B in front, using only a detection result by the radar 20.

Thus by using a weighting factor set according to a condition such as a day, a night, and a weather and detecting the area of the automobile B in front, because it is enabled to enhance a dependency ratio of a sensor of which a reliability is higher in various conditions, it is enabled to enhance a detection accuracy of the area of the automobile B and to shorten a time taken for the detection without being influenced by such a traffic environment outside an automobile.

The front area object detection mechanism 15 is configured to detect an area of the automobile B in front, a distance from the automobile A to the automobile B, and a relative speed between them, based on a reflection wave from front of the automobile A scanned and detected by the radar 20. Meanwhile, in the embodiment, in a case of using the front area object detection mechanism 15 and detecting the automobile B in front, a detection accuracy of an object is inspected and a reliability of the object detection is improved by comparing a position and a size between the area of the automobile B detected by the mechanism 15 with those of the processing area 32 (see FIG. 3A) set within the taken image 31 with using the processing area setting mechanism 11.

The processing area object detection mechanism 13 does not analyze all reflection waves from front, analyzes a reflection wave in the processing area 32 set within the taken image 31 as shown in FIG. 3A, and thereby, it is enabled to detect a distance from the automobile A to the automobile B in front; therefore, it is enabled to improve an analysis capacity of a reflection wave from the automobile B without increasing a processing amount of the control unit 10, and to accurately detect a distance from the automobile A to the automobile B in a short time.

The collision determination mechanism 14 is configured, as shown in FIGS. 1A to 2, to derive a positional relationship between the automobiles A and the automobile B in front, based on an area of the automobile B detected with the processing area object detection mechanism 13 and the front area object detection mechanism 15, a distance from the automobile A to the automobile B, and a relative speed between them; to determine that there exists a possibility of a collision between the automobiles A and B, in a case that the automobile B approaches more than a predetermined value; and to send a startup signal to the protector 40.

The protector 40 is configured, in a case of receiving a startup signal from the collision determination mechanism 14, to move the front bumper 41 forward, to provide a space between the front bumper 41 and an automobile body frame before a collision, and thereby to improve an impact absorption performance in the collision.

Thus the collision prediction apparatus 1 of the present invention analyzes a reflection wave of the radar 20 in the processing area 32 set within the taken image 31 as shown in 3A, thereby detects a distance from the automobile A to the automobile B in front, and determines a possibility of a collision; therefore, it is enabled to improve an analysis capacity of a reflection wave from the automobile B and to accurately detect a distance from the automobile A to the automobile B. Accordingly, it is enabled to accurately predict a collision in a short time and to improve a prediction ability of the collision without using a processor higher in processing capacity.

The prediction system selection mechanism 16 is configured to select a requested mechanism out of respective mechanisms 12, 13, 14, and 15 of the control unit 10 in order to perform a collision prediction adequate for lightness input from the illuminance sensor 50; in the embodiment, the mechanism 16 is configured to select the processing area setting mechanism 11, the reflection wave extraction mechanism 12, the processing area object detection mechanism 13, and the collision determination mechanism 14 in a case that it is lighter outside an automobile than a predetermined value, and to select the front area object detection mechanism 15 and the collision determination mechanism 14 in a case that it is darker outside the automobile than the predetermined value.

Next will be described a collision prediction method using the collision prediction apparatus 1 of the embodiment. In a description below each component of the collision prediction apparatus 1 is supposed to refer to FIG. 1B as needed.

In addition, starting up the automobile A, the illuminance sensor 50 detects lightness outside automobile A, sends the data to the prediction system selection mechanism 16, and the mechanism 16 selects a requested mechanism out of respective mechanisms 12, 13, 14, and 15 in order to perform a collision prediction adequate for lightness input from the sensor 50.

Firstly will be described a case that it is lighter outside an automobile than a predetermined value. In this case the prediction system selection mechanism 16 is adapted to select the processing area setting mechanism 11, the reflection wave extraction mechanism 12, the processing area object detection mechanism 13, and the collision determination mechanism 14.

Subsequently, as shown in FIG. 2, the radar 20 and the camera 30 start to scan front of the automobile A and take an image thereof.

Meanwhile, although the taken image 31 (see FIG. 3A) taken by the camera 30 may be displayed in such a monitor provided within the driving room A2 (see FIG. 1A) of the automobile A, it may not be displayed if not especially requested.

As shown in FIG. 3A, the processing area setting mechanism 11 recognizes an image of the automobile B in front from within the taken image 31 and sets the processing area 32 so as to include the image of the automobile B.

In addition, the reflection wave extraction mechanism 12 extracts a reflection wave in the processing area 32 set with the processing area setting mechanism 11 out of reflection waves from front, which is scanned by the radar 20.

Furthermore, as shown in FIG. 3B, the processing area object detection mechanism 13 makes the graph 13a showing a relationship between a direction and intensity of a reflection wave extracted with the reflection wave extraction mechanism 12; defines a direction corresponding to the peak values P1, P2, and P3 of the intensity as that of the automobile B (see FIG. 3A) in front; detects an area of the automobile B, based on a spread of the reflection wave in the direction; and detects a distance from the automobile A to the automobile B and a relative speed between them, based on the peak values P1, P2, and P3 of the intensity.

At this time, as shown in FIG. 3A, the processing area object detection mechanism 13 analyzes a reflection wave in the processing area 32 set within the taken image 31 without analyzing all reflection waves from front, thereby can detect an area of the automobile B in front, a distance from the automobile A to the automobile B, and a relative speed between them; therefore, it is enabled to improve an analysis capacity of the reflection wave from the automobile B without increasing a processing amount of the control unit 10, and to accurately detect the distance from the automobile A to the automobile B in a short time.

Then the collision determination mechanism 14 derives a positional relationship based on the area of the automobile B in front, the distance from the automobile A to the automobile B, and the relative speed between them detected by the processing area object detection mechanism 13; and in a case that the automobile B approaches more than a predetermined value, determines that there exists a possibility of the automobile A colliding with the automobile B, and as shown in FIG. 1A, sends a startup signal to the protector 40.

The protector 40 receiving the startup signal from the collision determination mechanism 14 moves the front bumper 41 forward, provides a space between the front bumper 41 and an automobile body frame before a collision, and thereby improves an impact absorption performance in the collision.

Thus in a case that it is lighter outside an automobile, a reflection wave of the radar 20 in the processing area 32 set within the taken image 31 is analyzed as shown in FIG. 3A; thereby an area of the automobile B in front, a distance from the automobile A to the automobile B, and a relative speed between them are detected; a possibility of a collision is determined; and it becomes unnecessary to analyze all reflection waves from front. Therefore, it is enabled to improve an analysis capacity of a reflection wave from the automobile B in front and to accurately detect the distance from the automobile A to the automobile B in a short time without increasing a processing amount of the control unit 10. Thus it is enabled to accurately predict a collision in a short time and to improve a prediction ability of the collision without using a processor higher in processing capacity.

Next will be described a case that it is darker outside an automobile than a predetermined value. In this case the prediction system selection mechanism 16 is adapted to select the processing area setting mechanism 11, the front area object detection mechanism 15, and the collision determination mechanism 14.

As shown in FIG. 2, if the radar 20 and the camera 30 start to scan front of the automobile A and take an image thereof, the front area object detection mechanism 15 detects an area of the automobile B in front, a distance from the automobile A to the automobile B, and a relative speed between them, based on a reflection wave from front of the automobile A scanned and detected by the radar 20.

As shown in FIG. 3A, the processing area setting mechanism 11 recognizes the image of the automobile B in front from within the taken image 31 and sets the processing area 32 so as to include the image of the automobile B. At this time, because it is dark outside the automobile A, the taken image 31 is unclear and a reliability of the processing area 32 is lowered.

The front area object detection mechanism 15 compares a position and a size between the area of the detected automobile B in front and the processing area 32 set by the processing area setting mechanism 11, thereby inspects a detection accuracy of an object, and improves a reliability of the object detection.

Then, same as in a case that it is light outside an automobile, in a case that the collision determination mechanism 14 determines that there exists a possibility of a collision with the automobile B in front based on an area of the automobile B, a distance from the automobile A to the automobile B, and a relative speed between them detected by the front area object detection mechanism 15, the protector 40 moves the front bumper 41 forward, provides a space between the front bumper 41 and the automobile body frame before the collision, and thereby improves an impact absorption performance in the collision.

Thus in a case that it is darker outside an automobile than a predetermined value, by taking precedence of information from the radar 20 and comparing it with information from the camera 30, it is configured to detect an area of the automobile B in front, a distance from the automobile A to the automobile B, a relative speed between them; therefore, even in a case that it is dark outside an automobile, a taken image of a camera becomes unclear, and a reliability of the image is lowered, it is enabled to detect an object in front of the automobile and predict a collision.

Accordingly, because the collision prediction apparatus 1 of the embodiment is configured to select a collision prediction system adequate for a condition such as an input traffic environment and to predict a collision between the automobile A and the automobile B in front, it is enabled to accurately detect the automobile B and predict the collision according to variations of various traffic environments.

Figure 7:
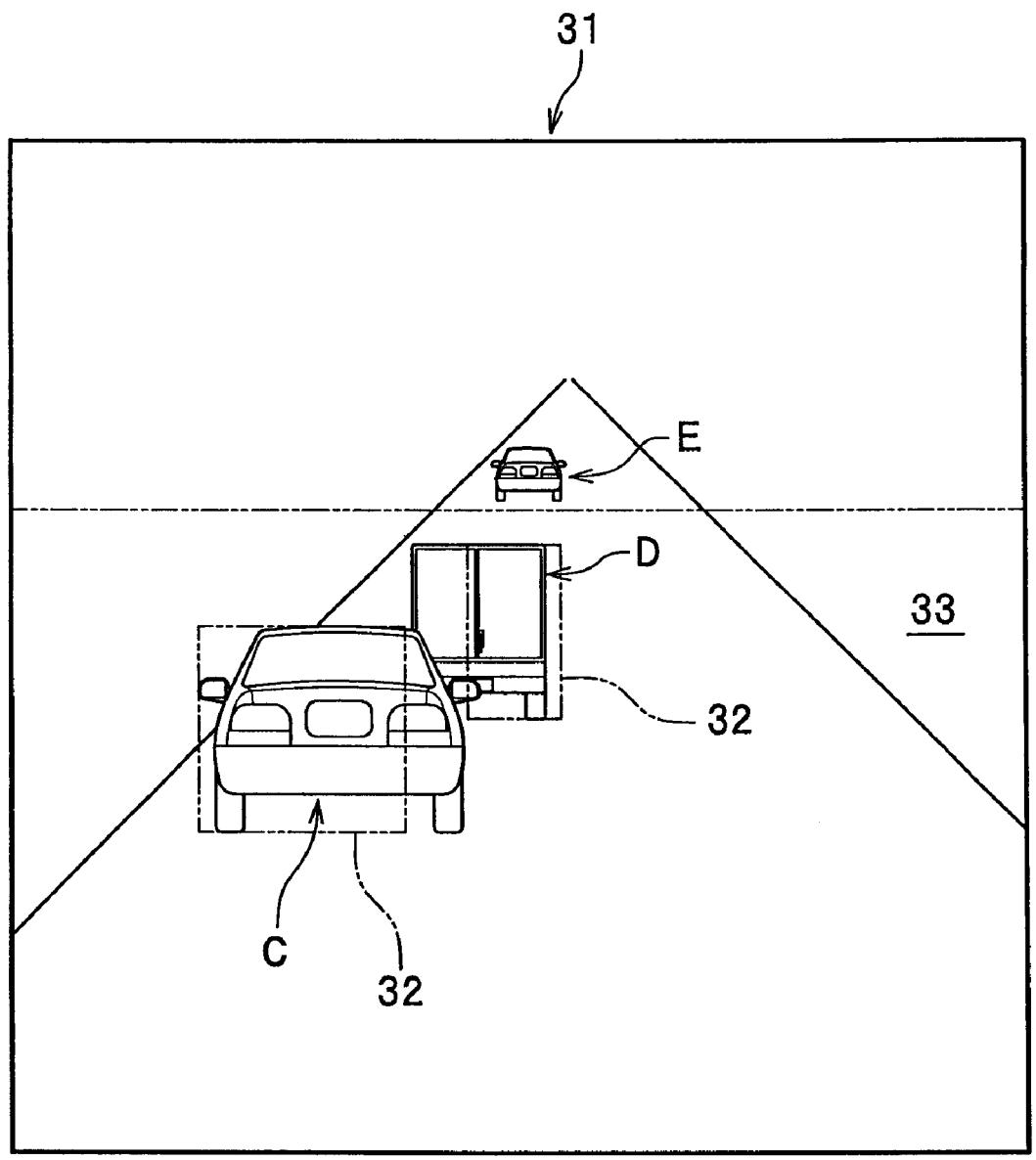
FIG. 7 is a drawing showing another configuration (embodiment) of a collision prediction apparatus of the embodiment, and is a taken image in a case of having detected a plurality of automobiles.

Thus although the embodiment of the present invention is described, the invention is not limited thereto. FIG. 7 is a drawing showing another configuration (embodiment) of a collision prediction apparatus of the present invention and is a taken image in a case of having detected a plurality of automobiles.

Although in the aforementioned embodiment is described a configuration of predicting a collision between the automobile A and one automobile B existing in front as shown in FIG. 2, it can also be configured as shown in FIG. 7 to predict collisions with a plurality of automobiles C, D, and E existing in front of the automobile A.

In this configuration the processing area setting mechanism 11 is configured to divide the taken image 31 at a position corresponding to a predetermined distance in front and to set processing areas 32, 32 to the automobiles C, D within an area 33 nearer than the predetermined distance.

Thus because it becomes unnecessary to analyze a reflection wave from the automobile E more distant from the automobile A and lower in collision possibility, it is enabled to reduce a processing amount of the control unit 10 and to shorten a time taken for predicting the collision.

Meanwhile, as a method of dividing the taken image 31 at a position corresponding to a predetermined distance in front, for example, there exist a method of defining the position corresponding to the predetermined distance in front by a view difference of two cameras and another method of defining the position corresponding to the predetermined distance in front by deriving a distance till an object according to a position (vertical coordinate) in up/down directions of the object within the taken image 31; the method of dividing the taken image 31 is not specifically limited.

In addition, even in a case that there exist a plurality of the automobiles C and D in front of the automobile A and the automobiles C and D in front overlap in front/back directions as shown in FIG. 7, the processing area setting mechanism 11 recognizes images of the automobiles C and D within the taken image 31, thereby sets the processing areas 32, 32 corresponding to each of the automobiles C and D, and therefore, can set each of the processing areas 32, 32 in a state of not overlapping.

Thus even in a case that the automobiles C and D in front overlap, the processing area setting mechanism 11 can detect them individually and distances from each of them accurately and predict a collision with each of them.

Thus, in a case that a plurality of the processing areas 32, 32 are set within the taken image 31 in the processing area setting mechanism 11, because it is enabled to accurately predict a possibility of a collision with each of the automobiles C and D in front by configuring the control unit 10 so as to determine the possibility of the collision for each of the processing areas 32, 32, it is enabled to handle a complicated traffic environment.

In addition, as another configuration of the collision prediction apparatus 1 of the aforementioned embodiment, in the processing area setting mechanism 11 it is enabled to configure so that the control unit 10 comprises an object movement direction detection mechanism 18 for dividing a processing area into a front area and side area of an automobile in front and, based on a movement direction of the side area, determining a possibility of a collision between the automobile A and the automobile in front.

Figure 8A:
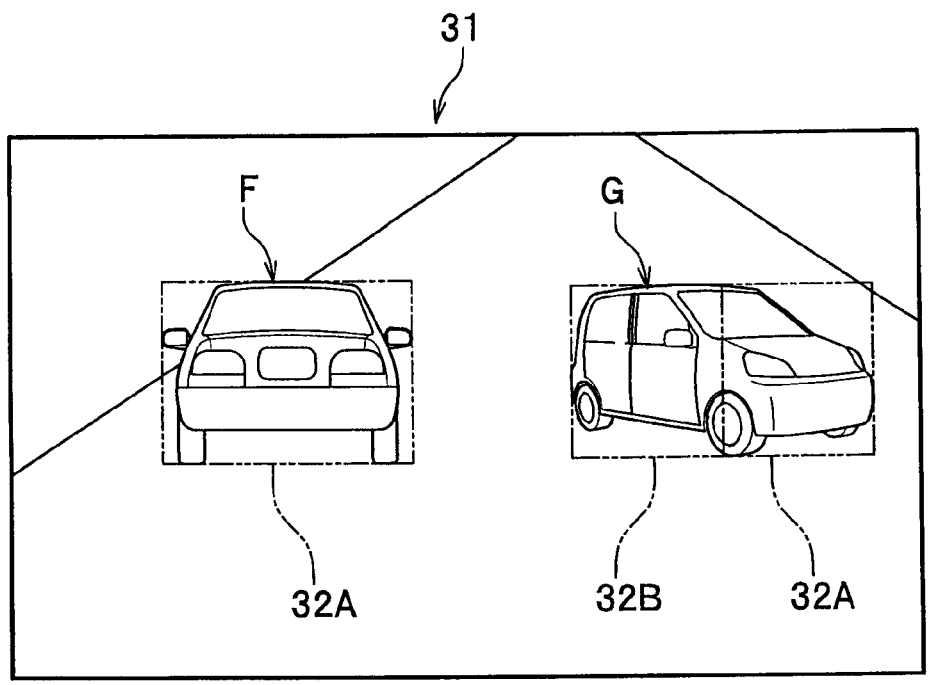
FIGS. 8A and 8B are drawings showing another configuration of a collision prediction apparatus of the embodiment.
Figure 8B:
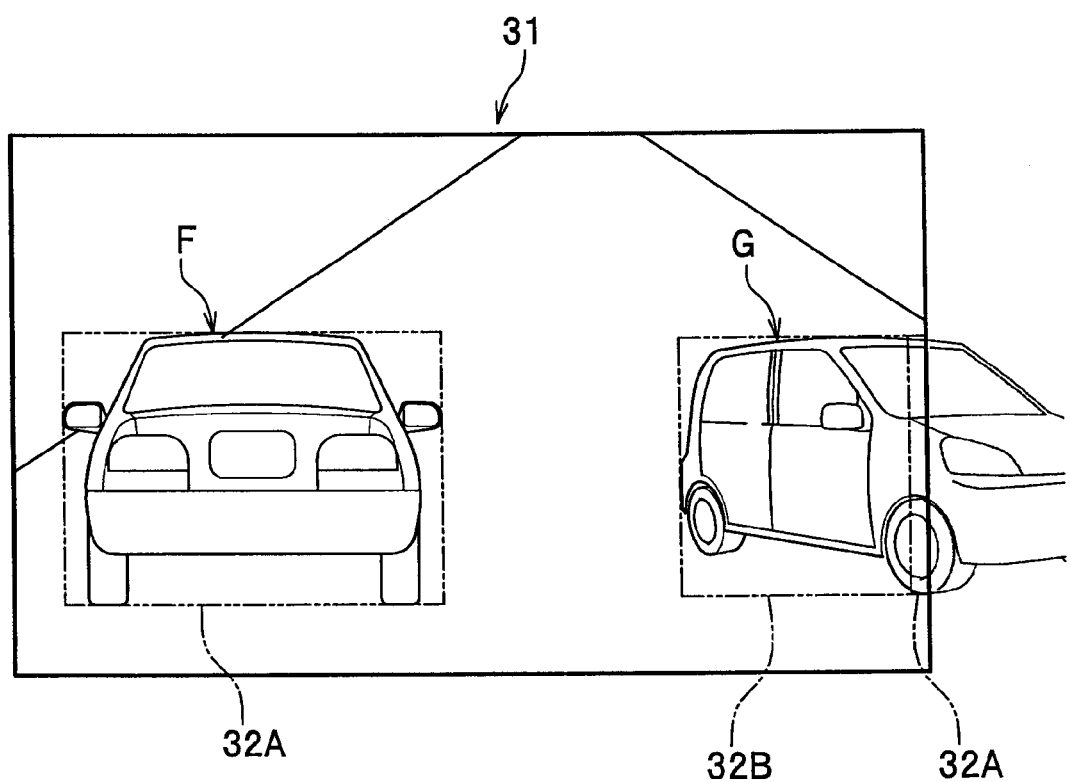

FIGS. 8A and 8B are drawings showing another configuration of a collision prediction apparatus of the present invention; FIG. 8A is the taken image 31 in a state of processing areas of automobiles F, G in front being divided into a front area and a side area; FIG. 8B is the taken image 31 of the automobiles F, G in front having approached from the state of FIG. 8A.

In this configuration the processing area setting mechanism 11 divides, as shown in FIG. 8A, each of the processing areas 32, 32 of the automobiles F, G in front into a front area 32A and a side area 32B, based on such variations of shapes and lightness in images of the automobiles F, G recognized within the taken image 31.

At this time, in the taken image 31 shown in FIG. 8A, because the automobile F in front runs in a same direction, steering a back face (front) toward the automobile A, only the front area 32A is set in the processing area 32. On the other hand, because the automobile G in front running in an opposite direction so as to deviate from the automobile A is obliquely disposed with respect to the automobile A, the processing area 32 of the automobile G results in being divided into the front area 32A and the side area 32B.

The object movement direction detection mechanism 18 is configured to compare positions of the side area 32B between the state of FIG. 8A and that of FIG. 8B where a time has elapsed from the state of FIG. 8A, thereby to recognize a movement direction of the side area 32B, and to determine that there exists no possibility of a collision in a case that the side area 32B moves from a center portion to any one of left/right directions of the taken image 31.

In addition, the processing area object detection mechanism 13 is configured in the object movement direction detection mechanism 18 to detect an area of the automobile G in front, a distance from the automobile A to the automobile G, and a relative speed between them in a case that the automobiles A and G are determined to have a possibility of a collision.

Meanwhile, in a case that a side area is not set as in the automobile F running in a same direction as the automobile A and a movement of the side area cannot be recognized, the object movement direction detection mechanism 18 is configured to determine that there exists a possibility of a collision between the automobile A and the automobile F in front.

Thus by dividing the processing area 32 of the automobile G existing in front of the automobile A into the front area 32A and the side area 32B, detecting a movement direction of the side area 32B, and grasping in which direction the automobile G is moving with respect to the automobile A, it is enabled to improve a prediction accuracy of a collision.

In addition, another configuration of the collision prediction apparatus 1 of the aforementioned embodiment can be configured so that: the processing area object detection mechanism 13 makes a relationship between a direction and intensity of a reflection wave extracted by the reflection wave extraction mechanism 12 for every predetermined time; and the collision determination mechanism 14 sequentially compares the relationship between the direction and intensity of the extracted reflection wave, and in a case that a number of a peak value of the intensity is reduced, determines that there exists no possibility of a collision.

Figure 9A:
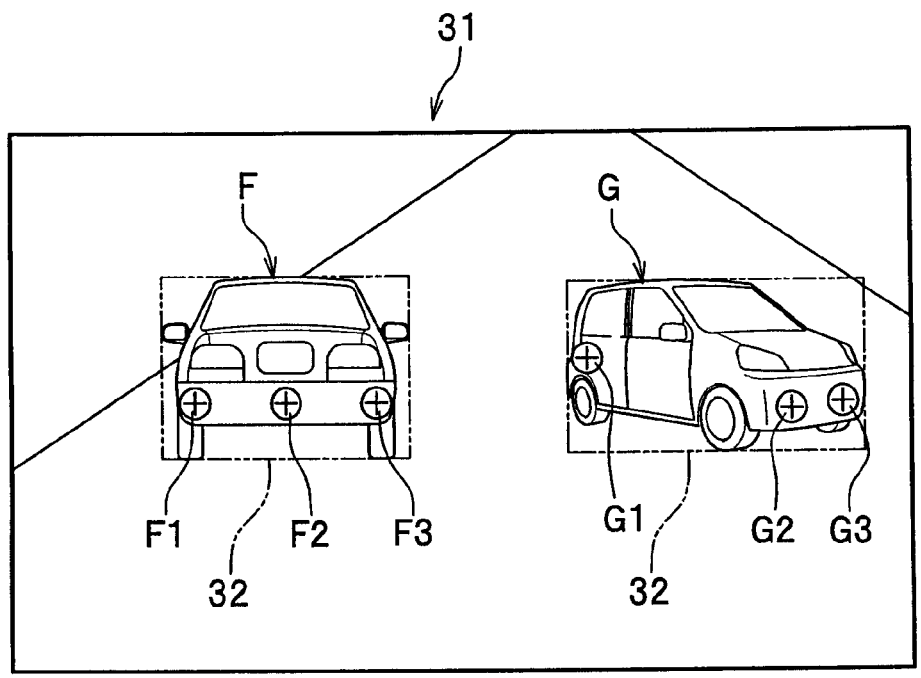
FIGS. 9A and 9B are drawings showing another configuration of a collision prediction apparatus of the embodiment.
Figure 9B:
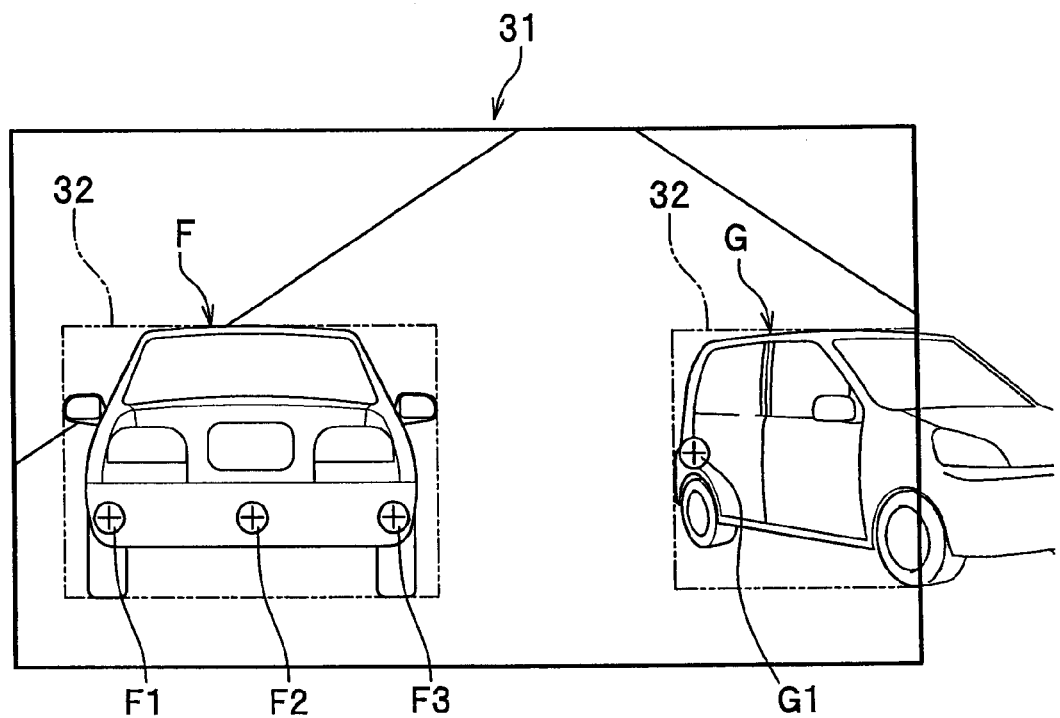

FIGS. 9A and 9B are drawings showing another configuration of a collision prediction apparatus of the present invention; FIG. 9A is the taken image 31 in a state of the automobiles F, G in front being detected; FIG. 9B is the taken image 31 in a state of reflection points being reduced by the automobiles F, G in front approaching from the state of FIG. 9A.

In this configuration, although the processing area object detection mechanism 13 can recognize in the state of FIG. 9A peak values of the intensity of a reflection wave from three reflection points G1, G2, and G3 in the automobile G in front running toward an opposite direction so as to deviate from the automobile A, if the automobile G in front approaches the automobile A as shown in FIG. 9B, the reflection points G2, G3 within the processing area 32 of the automobile G deviate from the taken image 31, the mechanism 13 results in recognizing only the peak value of the intensity of the reflection wave from one reflection point G1.

Then, as described above, in a case that peak values (reflection points) of the intensity of the reflection wave in the processing area 32 are reduced as a time elapses, the collision determination mechanism 14 is configured to judge that the automobile G in front moves in a direction deviated from the automobile A and an overlap amount in front/back directions between the automobile A and the automobile G is reduced, and to determine that there exists no possibility of a collision or less severity thereof.

On the other hand, with respect to the automobile F running in a same direction as the automobile A, the processing area object detection mechanism 13 can recognize three reflection points F1, F2, and F3 in the states of FIGS. 9A and 9B. In such the case the collision determination mechanism 14 is configured to determine a possibility of a collision, based on an area of the automobile F in front, a distance from the automobile A to the automobile F, and a relative speed between them.

Thus in a case that a number of peak values (reflection points) of an intensity of a reflection wave in the processing area 32 is reduced and an overlap amount between the automobile A and the automobile G in front in front/back directions is reduced, the collision determination mechanism 14 is configured to determine that there exists no possibility of a collision or less severity thereof, and thereby, it is enabled to improve a prediction accuracy of the collision.

In addition, another configuration of the collision prediction apparatus 1 of the aforementioned embodiment can be configured so that: the processing area object detection mechanism 13 makes an area of an automobile in front for every predetermined time; and the collision determination mechanism 14 sequentially combines the area of the automobile in front made for the predetermined time.

Figure 10:
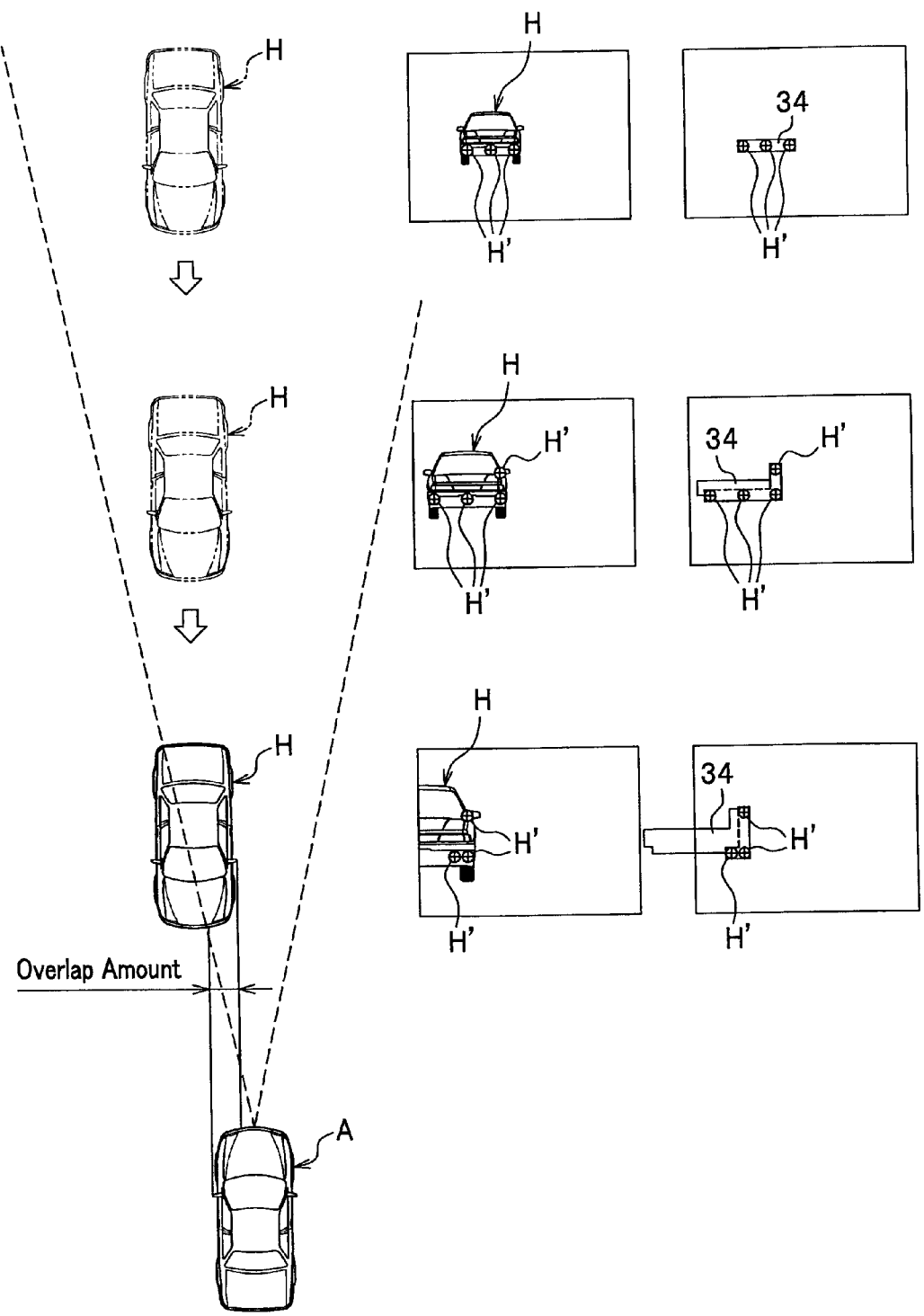
FIG. 10 is a drawing showing another configuration of the embodiment and is a conceptual drawing showing taken images and made areas of an automobile in front for every predetermined time, making a relationship with the automobile in front correspond to plan views shown for the predetermined time.

FIG. 10 is a drawing showing another configuration of the aforementioned embodiment and is a conceptual drawing showing taken images and made areas of an automobile H in front for every predetermined time, making a relationship with the automobile H in front correspond to plan views shown for the predetermined time.

Here, as shown in FIG. 10, in the radar 20 reflection points H' of the automobile H in front move and increase or decrease as a time elapses in some case. Consequently, the processing area object detection mechanism 13 sequentially combines areas 34 of the automobile H in front made for every predetermined time, thereby even a number and position of the reflection points H' of a reflection wave vary as a time elapses, and because it is enabled to estimate an area 34 of a whole of the automobile H, based on the areas 34 thereof made till then and to derive an overlap amount between the automobile A and the automobile H, based on the estimated area 34 of the automobile H, it is enabled to improve a prediction accuracy of a collision.

Meanwhile, when sequentially combining an area 34 of the automobile H in front, it is adapted to estimate a size of the area 34 of the automobile H in front after an elapse of a predetermined time, based on a speed vector of a reflection wave and to overlap and combine a newly made area 34 of the automobile H with the estimated area 34 thereof Furthermore, another configuration of the collision prediction apparatus 1 of the aforementioned embodiment can be configured so that the control unit 10 comprises an object error detection mechanism 17 for detecting an error between the processing area 32 (see FIG. 3A) set with the processing area setting mechanism 11 and an area of the automobile B in front detected with the processing area object detection mechanism 13.

Thus by detecting an error between the processing area 32 set with the processing area setting mechanism 11 and an area of the automobile B in front detected with the processing area object detection mechanism 13, it is enabled to compare a size of the automobile B recognized from the taken image 31 of the camera 30 and that of the detected automobile B, based on an reflection wave of the radar 20, and to analyze a detection accuracy of the camera 30 and the radar 20.

As a usage mode of this analysis result, for example, in a case of taking precedence of information from the radar 20 and predicting a collision in a traffic environment where it is dark outside an automobile at night and the like, it is enabled to improve a prediction accuracy of the collision in the traffic environment where it is dark outside the automobile at night and the like by adding an error detected with the object error detection mechanism 17 while it is light outside the automobile.

In addition, although in the aforementioned embodiment the processing area object detection mechanism 13 is configured as shown in FIG. 3B to make it a direction of the automobile B in front (see FIG. 2) the direction corresponding to the peak values P1, P2, and P3 of the intensity, it is also enabled to specify the direction of an automobile by other methods.

Figure 11A:
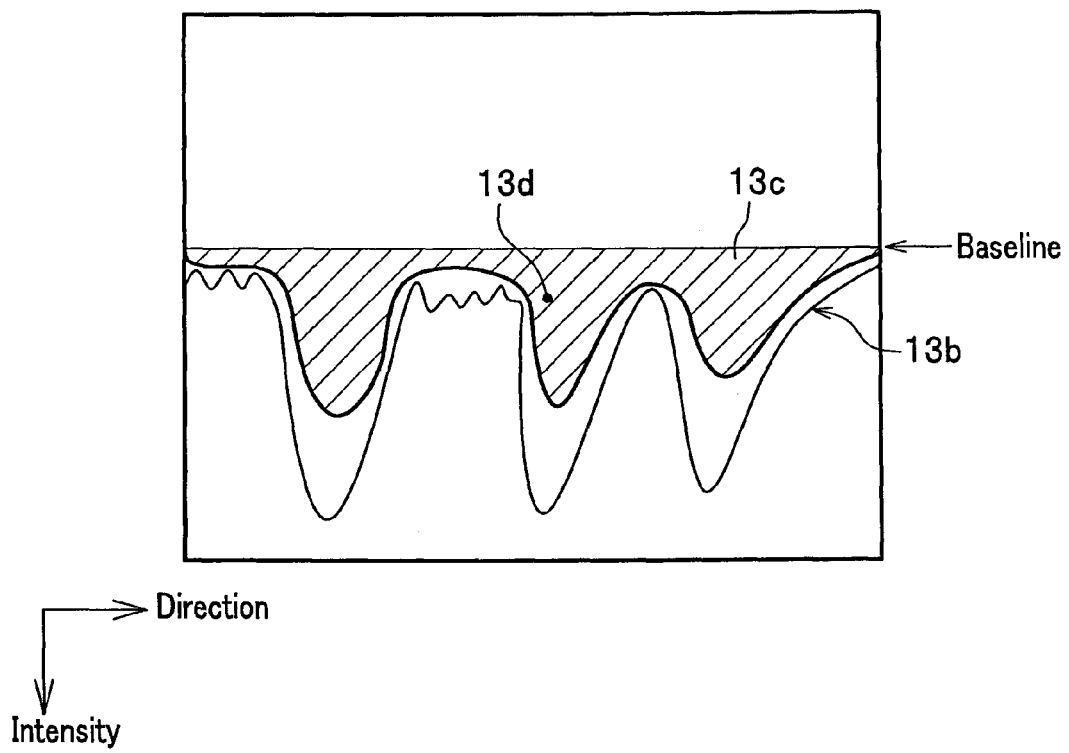
FIGS. 11A and 11B are drawings showing another configuration in a collision prediction apparatus of the embodiment.
Figure 11B:
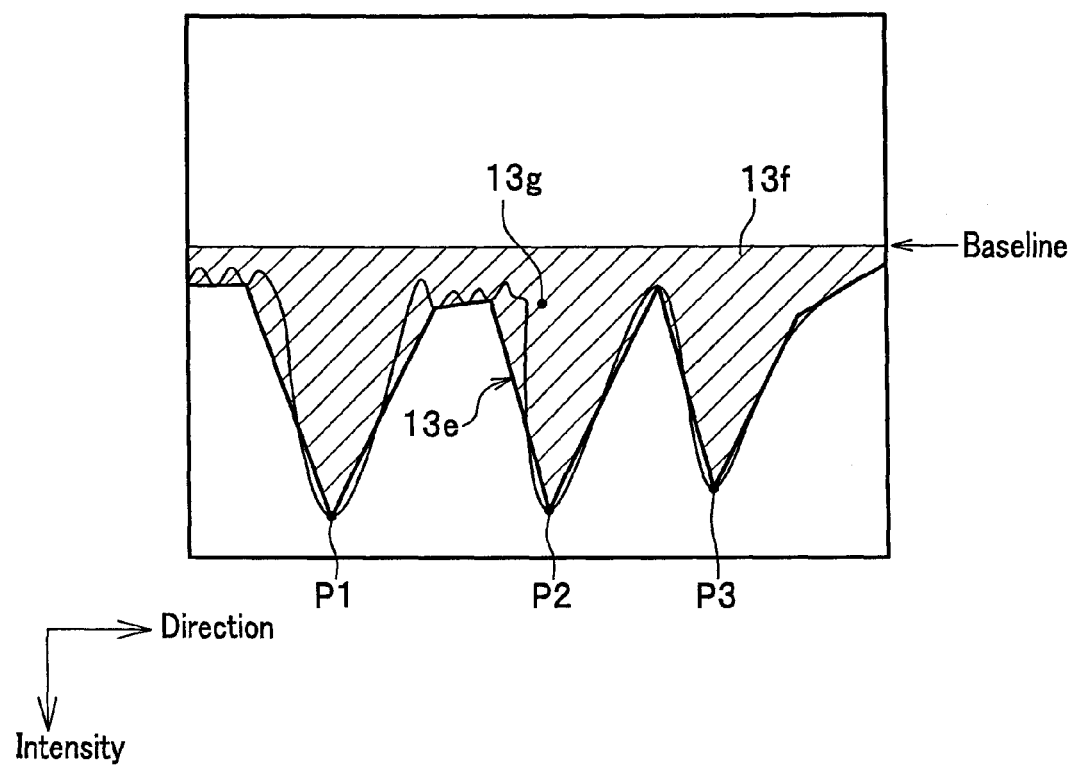

FIGS. 11A and 11B are drawings showing another configuration of the aforementioned embodiment; FIG. 11A is a drawing where a graph of a waveform consisting of a relationship between a direction and intensity of a reflection wave is performed with low pass filter processing; and FIG. 11B is a graph where a plurality of peak values are connected in the intensity of the reflection wave.

As shown in FIG. 11A, the processing area object detection mechanism 13 may also be configured to make a graph 13b of a waveform consisting of a direction and intensity of an extracted reflection wave, to perform low pass filter processing to the graph 13b, and thereafter to make it a direction of an automobile in front the direction corresponding to a gravity center position 13d of an area 13c calculated by integrating the intensity.

In addition, as shown in FIG. 11B, the processing area object detection mechanism 13 may also be configured to make a graph 13e where a plurality of the peak values P1, P2, and P3 in the intensity of an extracted reflection wave are connected and to make it a direction of an automobile in front the direction corresponding to a gravity center position 13g of an area 13f calculated by integrating the graph 13e.

Thus by performing low pass filter processing to the graph 13b consisting of a direction and intensity of an extracted reflection wave, and thereafter making it a direction of an automobile in front the direction corresponding to any one of the gravity center position 13d of the area 13c calculated by integrating the intensity and the gravity center position 13g of the area 13f calculated by integrating the graph 13e where a plurality of the peak values P1, P2, and P3 are connected, it is enabled to specify the direction of the automobile in front and to improve a prediction accuracy of a collision even if some noise enters the reflection wave.

In addition, as shown in FIG. 2, although the collision prediction apparatus 1 of the embodiment predicts a collision between the automobile A and the automobile B in front, an object becoming an objective for which a collision is predicted may be various objects such as a structure and a pedestrian, and is not limited to an automobile.

Furthermore, as shown in FIG. A in the embodiment, as a protector for protecting a passenger when the automobile A collides with an object in front, although the protector 40 is used for providing a space between the front bumper 41 and the automobile body frame, a configuration of the protector is not limited to the protector 40; For example, in a case that the collision prediction apparatus 1 determines that there exists a possibility of a collision with the object in front, a protector may also be used for fixing a passenger on a seat by actuating a pretensioner mechanism of a seat belt apparatus and winding up a seat belt thereof.

In addition, as a sensor for detecting the automobile B in front, a laser may also be mounted on a vehicle other than the radar 20 and the camera 30, and it is preferable to combine sensors such as the radar 20, the camera 30, the laser, corresponding to various traffic environments, or to use one kind of sensor, and to predict a collision.

Figure 12:
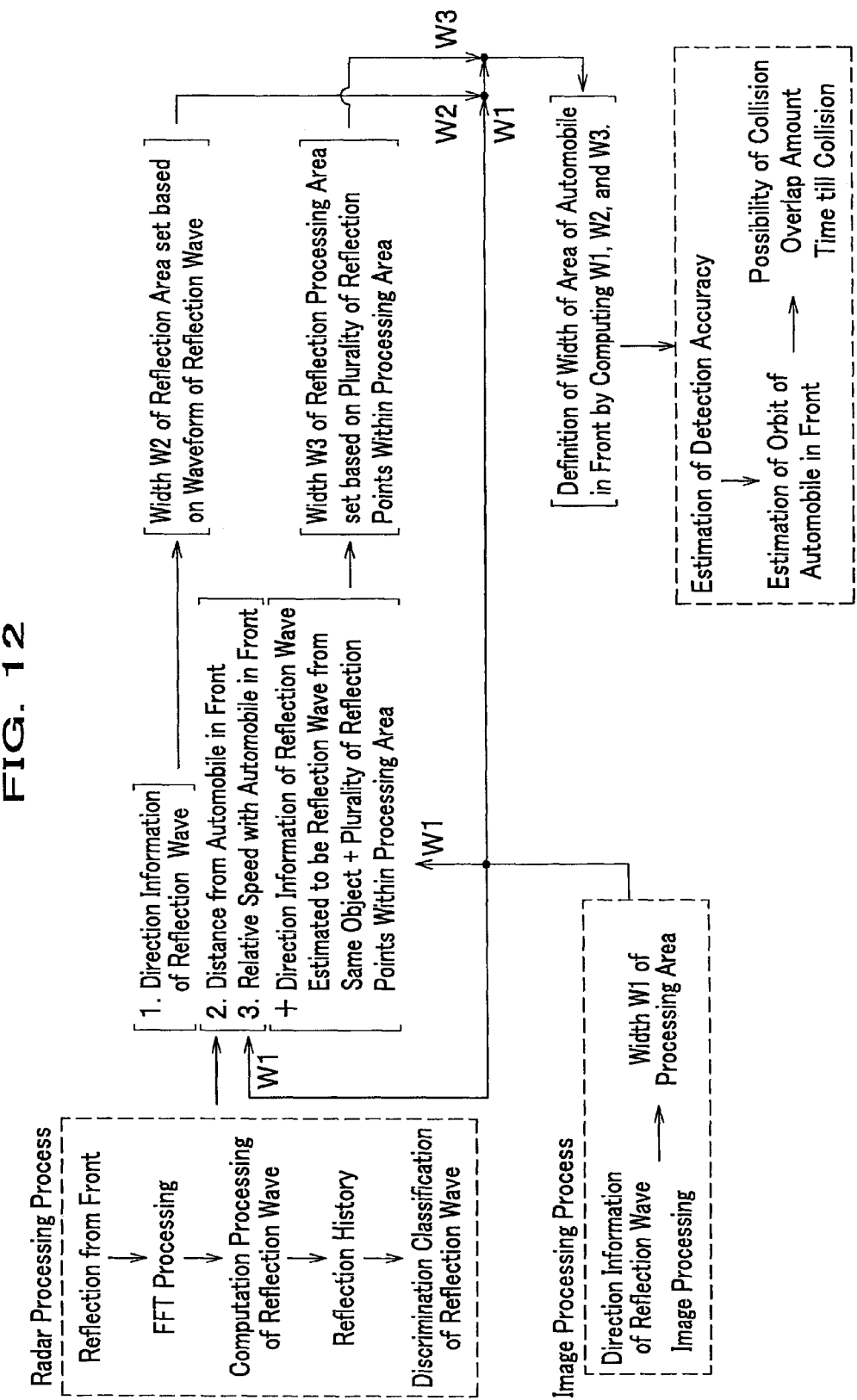
FIG. 12 is a conceptual drawing showing one example of a collision prediction method of the present invention.

FIG. 12 is a conceptual drawing showing one example of a collision prediction method of the present invention; referring to FIG. 12, the one example of the collision prediction method will be described.

Firstly, scanning front of an automobile, a direction (direction information) of the automobile is detected, based on a reflection wave of a radar.

To be more precise, making a graph of a waveform consisting of a relationship of a direction and intensity of an extracted reflection wave and performing FFT (Fast Fourier Transfer) filter processing to the graph, the direction of the automobile in front is adapted to be detected. In addition, sequentially comparing histories of distance values and relative speeds detected from detected reflection waves for every predetermined time, reflection waves of which differences of the distance values and the relative speeds become not more than thresholds set in advance are adapted to be estimated (discriminatingly classified) to be the reflection waves from a same object (automobile in front).

In addition, recognizing an image of the automobile B in front from a whole of a taken image thereof taken by the camera 30, the width W1 of the processing area 32 shown in FIG. 5 is set within the taken image so as to include the image of the automobile B.

In addition, based on the direction information is set the width W2 of a reflection area of an area of a reflection wave within the width W1 of the processing area 32 and is detected the width W3 of a reflection processing area of the area estimated to be the reflection wave from the automobile B in front. Meanwhile, the width W3 of the reflection processing area is defined by a plurality of reflection points within the processing area 32.

In addition, based on the reflection wave within the width W1 of the processing area 32 are detected a distance from the automobile A to the automobile B in front and a relative speed between them.

Furthermore, multiplying the width W1 of the processing area 32, the width W2 of the area of the reflection wave within the processing area 32, and the width W3 of the reflection processing area of the area, which is estimated to be the reflection wave from the automobile B in front, by weighting factors according to a traffic environment such as a day, a night, and a weather, and thereafter adding the width W1 of the processing area 32, the width W2 of the reflection area, and the width W3 of the reflection processing area, a width of an area of the automobile B is defined.

Then by estimating a detection accuracy of the automobile B in front and compensating an error thereof, based on such error information of the radar 20 and the camera 30, and estimating an orbit of the automobile B, based on an area of the automobile B, a distance from the automobile A to the automobile B, and a relative speed between them, a possibility of a collision, an overlap amount in a case of the collision, and a time till the collision are determined.

In accordance with such the collision prediction method, because direction information is firstly detected, image processing is performed for only a predetermined range, based on the direction information, and the range of the image processing is narrowed down, it is enabled to reduce a load of the image processing.

In addition, because when detecting a distance and a relative speed with respect to the automobile B in front, they are detected based on a reflection wave within the width W1 of the processing area 32 set within a taken image, it is enabled to reduce a processing load of a collision prediction.

What is claimed is:

1. A collision prediction apparatus comprising:
a plurality of sensors configured to detect an object in front of a vehicle by different mechanisms, the plurality of the sensors comprising a radar configured to scan front of the vehicle and a camera configured to take an image of the front of the vehicle; and
a control unit configured to select a sensor adequate for an input condition, and based on information obtained from the selected sensor, to predict a collision between the vehicle and the object in front,
wherein in a case that a condition that the outside of the vehicle is lighter than a predetermined value, the control unit comprises:
a processing area setting mechanism configured to recognize an image of the object with the taken image of the camera and to set a processing area within the taken image to include the image of the object;
a reflection wave extraction mechanism configured to extract a reflection wave of the radar in the processing area;
a processing area object detection mechanism configured to detect an area of the object, a distance from the vehicle to the object, and a relative speed between the vehicle and the object, based on the reflection wave extracted from the processing area; and a collision determination mechanism configured to determine a possibility of a collision between the vehicle and the object, based on the distance from the vehicle to the object and the relative speed between the vehicle and the object, and to predict the collision between the vehicle and the object, and in a case that a condition that the outside of the vehicle is darker than the predetermined value, the control unit comprises:

an front area object detection mechanism configured to detect an area of the object, a distance from the vehicle to the object, and a relative speed between the vehicle and the object, based on a reflection wave from front of the vehicle scanned and detected by the radar; and the collision determination mechanism configured to predict a collision between the vehicle and the object.

2. The collision prediction apparatus according to claim 1, wherein the processing area setting mechanism defines as an area of the object the area obtained by multiplying the processing area, a reflection area of an area of a reflection wave extracted from the processing area, and a reflection processing area of an area, which is estimated to be a reflection wave from the object, by weighting factors according to an input condition, based on a difference of the reflection area detected for every predetermined time; and thereafter by adding the processing area, the reflection area, and the reflection processing area.

3. The collision prediction apparatus according to claim 1, wherein the control unit further comprises an object error detection mechanism configured to detect errors between the processing area set with the processing area setting mechanism and the area of the object detected with the processing area object detection mechanism.

4. The collision prediction apparatus according to claim 3, wherein the errors detected while the outside of the vehicle is light are added to the errors detected while the outside of the vehicle is dark to improve a prediction accuracy of the collision.

5. The collision prediction apparatus according to claim 1, wherein the processing area setting mechanism is configured to divide the processing area into a front area and side area of the object, and wherein the control unit further comprises an object movement direction detection mechanism configured to determine a possibility of a collision between the vehicle and the object, based on a movement direction of the side area.

6. The collision prediction apparatus according to claim 1, wherein the processing area setting mechanism is configured to divide the taken image at a position corresponding to a predetermined distance in front of the vehicle and to set the processing area within an area nearer than the predetermined distance.

7. The collision prediction apparatus according to claim 1, wherein the processing area object detection mechanism is configured to make an area of the object for every predetermined time, and the collision determination mechanism sequentially combines the area of the object made for every predetermined time.

8. The collision prediction apparatus according to claim 1, wherein in a relationship between a direction and intensity of the extracted reflection wave, the processing area object detection mechanism is configured to make the direction corresponding to a peak value of the intensity a direction of the object.

9. The collision prediction apparatus according to claim 8, wherein the processing area object detection mechanism is configured to make a graph consisting of a relationship between a direction and intensity of the extracted reflection wave for every predetermined time, wherein the collision determination mechanism is configured to sequentially compare the relationship between the direction and intensity of the extracted reflection wave, and based on a variation of a number of a peak value of the intensity, to determine a possibility of a collision between the vehicle and the object.

10. The collision prediction apparatus according to claim 1, wherein the processing area object detection mechanism is configured to make a graph of a waveform consisting of a relationship between a direction and intensity of the extracted reflection wave, to perform low pass filter processing to the graph, and thereafter to make the direction corresponding to a position of a gravity center of an area calculated by integrating the intensity a direction of the object.

11. The collision prediction apparatus according to claim 1, wherein in an intensity of the extracted reflection wave the processing area object detection mechanism is configured to make a graph where a plurality of peak values are connected and to make the direction corresponding to a position of a gravity center of an area calculated by integrating the intensity a direction of the object.

12. The collision prediction apparatus according to claim 1, wherein when in the processing area setting mechanism a plurality of the processing areas are set within the taken image, the control unit is configured to determine a possibility of a collision for every the processing area.

13. A collision prediction method for predicting a collision between a vehicle and an object in front, in a case that a condition that the outside of the vehicle is lighter than a predetermined value, the method comprising:

scanning front of the vehicle by radar, and based on a reflection wave of the radar, detecting direction information for indicating a direction of the object;

recognizing an image of the object from a whole of a taken image in front of the vehicle taken by camera, based on the direction information, and setting a processing area within the taken image so as to include the image of the object;

detecting an area of the object from the processing area, and based on a reflection wave of the radar extracted from the processing area, detecting a distance from the vehicle to the object and a relative speed between the vehicle and the object; and determining a possibility of a collision between the vehicle and the object, based on the area of the object, the distance from the vehicle to the object, and the relative speed between the vehicle and the object and in a case that a condition that the outside of the vehicle is darker than the predetermined value, the method comprising:

detecting an area of an object, a distance from the vehicle to the object, and a relative speed between the vehicle and the object, based on a reflection wave from front of the vehicle scanned and detected by the radar; and determining a possibility of a collision between the vehicle and the object, based on the distance from the vehicle to the object and the relative speed between the vehicle and the object, and to predict the collision between the vehicle and the object.

* * * * *